United States Patent [19]
Hayner

[11] 3,910,310
[45] Oct. 7, 1975

[54] CYLINDER AND PISTON PILOT VALVE SYSTEM

[75] Inventor: Paul F. Hayner, Lexington, Mass.

[73] Assignee: Sanders Associates, Inc., Nashua, N.H.

[22] Filed: Sept. 26, 1973

[21] Appl. No.: 400,751

[52] U.S. Cl. ............ 137/595; 137/609; 137/625.64; 137/627.5
[51] Int. Cl.................... F16k 31/02; F15b 13/043
[58] Field of Search............ 137/595, 596.17, 625.6, 137/625.61, 625.62, 625.63, 625.64, 625.65, 627.5, 609; 251/324

[56] References Cited
UNITED STATES PATENTS

| | | | |
|---|---|---|---|
| 2,973,746 | 3/1961 | Jupa | 137/625.64 X |
| 3,777,784 | 12/1973 | Nicholson | 137/625.62 |
| 3,805,840 | 4/1974 | Byers | 137/627.5 |

FOREIGN PATENTS OR APPLICATIONS

| | | | |
|---|---|---|---|
| 18,902 | 6/1970 | Japan | 137/596.17 |
| 23,599 | 10/1968 | Japan | 137/625.62 |

*Primary Examiner*—William R. Cline
*Assistant Examiner*—Gerald A. Michalsky
*Attorney, Agent, or Firm*—Louis Etlinger; William L. Hunter

[57] ABSTRACT

A piston and cylinder valve is described in which two identical pistons act within the same cylinder. A torque motor is provided with a finger which extends into the cylinder approximately in the center thereof. The two pistons are urged by springs toward each other and into engagement with opposite sides of the finger. By this simple arrangement, coupling between the torque motor and the pistons is achieved with neither backlash nor danger of binding. Additionally, provision is made for adjusting the neutral or reference position of the valve and also for adjusting the amount of dead space. According to one embodiment, two sleeves are provided, one for each piston, and are made with different diameter portions so as to be urged apart by fluid pressure and into engagement with position limiting screws. Adjustment of these screws adjusts the cut off positions of passageways in the sleeves with respect to the lands of the pistons. In accordance with another embodiment, no sleeves are required but adjacent ends of each piston are provided with adjusting screws by with the position of each piston relative to the actuating arm of the torque motor can be adjusted thereby adjusting the position of the cut-off edge of the lands with respect to the passageways in the valve body.

5 Claims, 4 Drawing Figures

U.S. Patent  Oct. 7, 1975  3,910,310
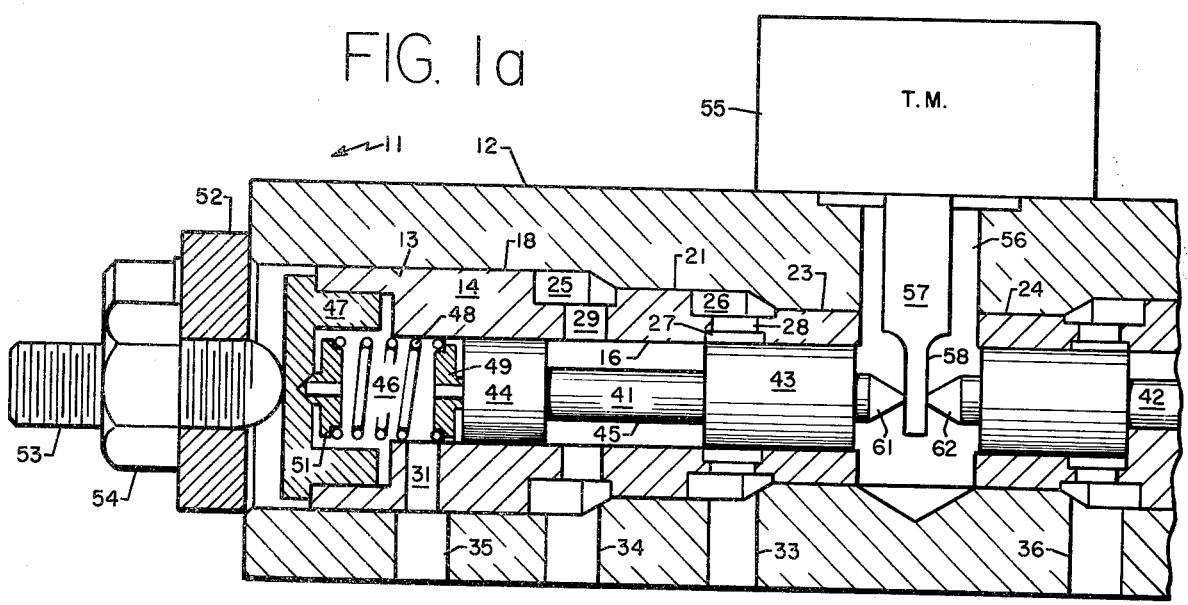
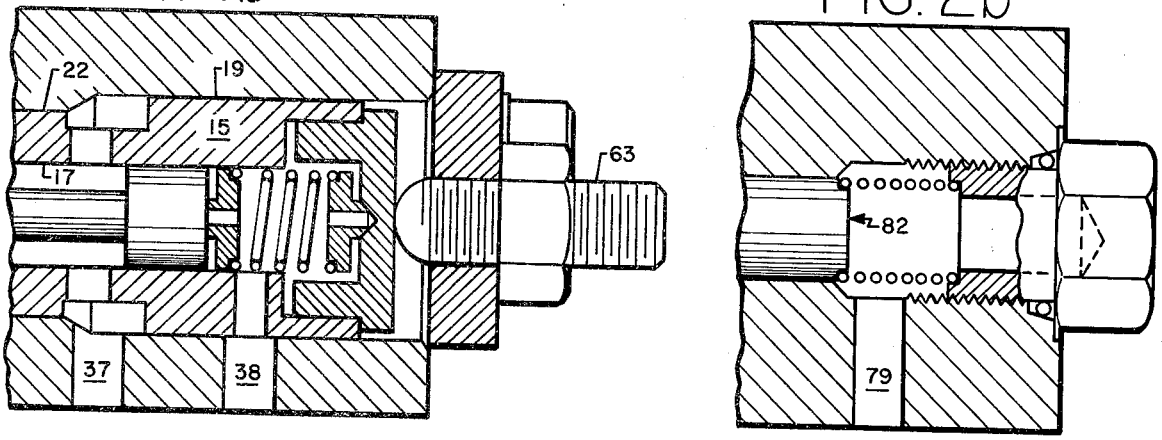
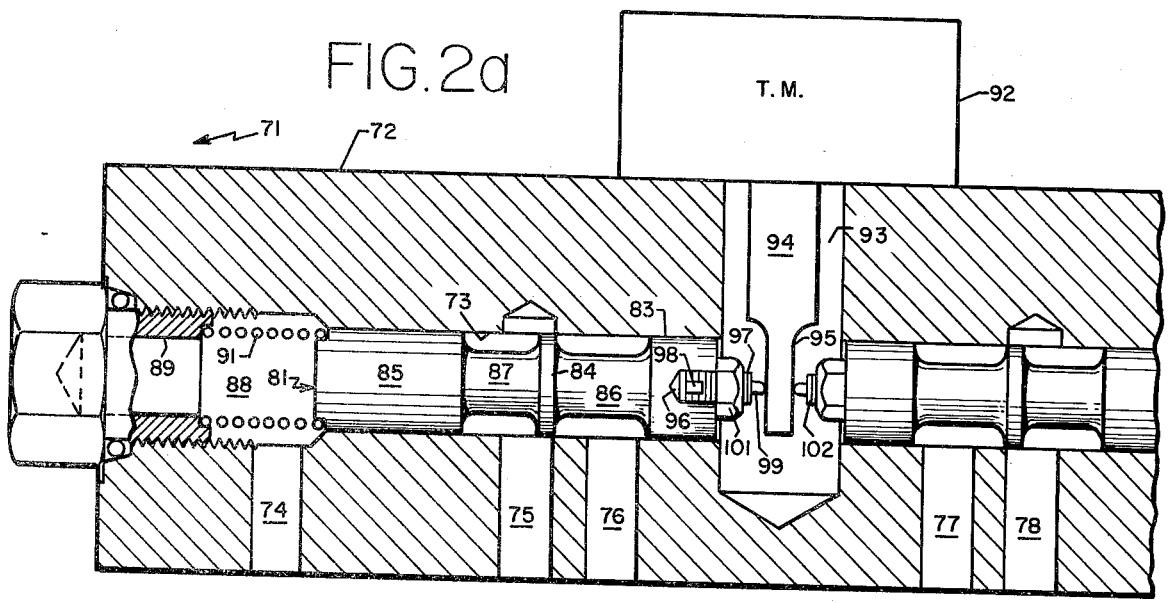

3,910,310

CYLINDER AND PISTON PILOT VALVE SYSTEM

FIELD OF THE INVENTION

This invention relates generally to a hydraulic system and particularly to a cylinder and piston valve system suitable for use as the first or pilot stage of a multistage valve system.

BACKGROUND OF THE INVENTION

Multistage valve systems normally comprise a first, or pilot stage including a hydraulic valve which is actuated by a torque motor or force motor in response to an electric signal so as to establish a pressure or a rate of flow in a control fluid. The control fluid is used to actuate a main, or second stage, valve which in turn actuates the useful load device.

Two of the most popular types of first stage valve have been the nozzle and flapper type and the cylinder and piston type. Each has its advantages and disadvantages. The flapper and nozzle type is in general less expensive although requiring a considerable flow of fluid even in the absence of an input signal. The cylinder and piston type, on the other hand, uses little or no fluid in the absence of an input signal. Additionally, it forms a ready made means of receiving a pressure on each end and converting it to a force proportional to the difference in the two pressures. This is a most useful device in pressure and/or flow control valves requiring force feedback to the pilot stage. However, the piston and cylinder valve is generally more expensive because it must be made to close tolerances so as to align the lands of the piston with the ports in the valve body so as to establish the neutral position accurately with just exactly the desired amount of "dead space." Another source of expense has been the need to provide a mechanism for coupling the force or torque motor to the piston in such a way as to avoid both backlash and binding.

One arrangement which partially overcomes the above disadvantages in the cylinder and piston type of valve is described in the copending application of James Thomas Green, Ser. No. 383,367, filed July 27, 1973 entitled "Cylinder and Piston Pilot Valve" and assigned to the same assignee as is the instant application. Briefly stated, that application describes a valve having two pistons arranged end to end, urged apart by a spring, but held just a short distance apart by a yoke on the arm of the torque motor which embraces collars formed on the ends of the pistons. The valve also includes first and second sleeves which are threaded into the valve body. This arrangement, although an improvement over prior valves, has certain disadvantages. One disadvantage is that it cannot use a standard off the shelf torque motor but requires one with a special actuating arm. Another disadvantage is that the assembly of the two pistons, the spring and the torque motor arm is time consuming and expensive. Another disadvantage is that the arrangement for adjusting the sleeves has been found to be awkward.

It is a general object of the present invention to provide an improved cylinder and piston type of valve.

A more specific object is to provide an improved dual piston pilot valve which is easy to manufacture and which is readily adjustable after assembly.

SUMMARY OF THE INVENTION

Briefly stated, a valve system incorporating the present invention includes the usual housing formed to define a hollow cylinder together with passageways communicating therewith at various points. Two pistons are disposed in the cylinder and are spring biased toward each other. The torque motor includes an actuating arm formed to define a finger which extends between adjacent ends of the pistons so that the pistons are urged into engagement with opposite sides of the finger. With this arrangement, it is easy to assemble the valve and both backlash and binding are eliminated. Adjustment of the null position and the amount of dead space may be achieved in either of two ways. In accordance with a first embodiment, the housing includes two sleeves which, during operation, are urged by fluid pressure apart from each other and into engagement with adjustable position limiting screws by means of which the position of each sleeve and the passageways therethrough may be adjusted relative to its associated piston. In accordance with a second embodiment, no sleeves are required and the adjusting screws are positioned in adjacent ends of the pistons so that the screws engage opposite sides of the finger of the torque motor. Adjustment of the screws adjusts the position of the pistons with respect to the passageways.

BRIEF DESCRIPTION OF THE DRAWINGS

For a clearer understanding of the invention reference may be made to the following detailed description and the accompanying drawing in which:

FIGS. 1a and 1b taken together are a cross section view, partly schematic, of one embodiment of the invention; and FIGS. 2a and 2b taken together are a cross section view, partly schematic, of another embodiment of the invention.

DESCRIPTION OF PREFERRED EMBODIMENTS

Figure 1A:
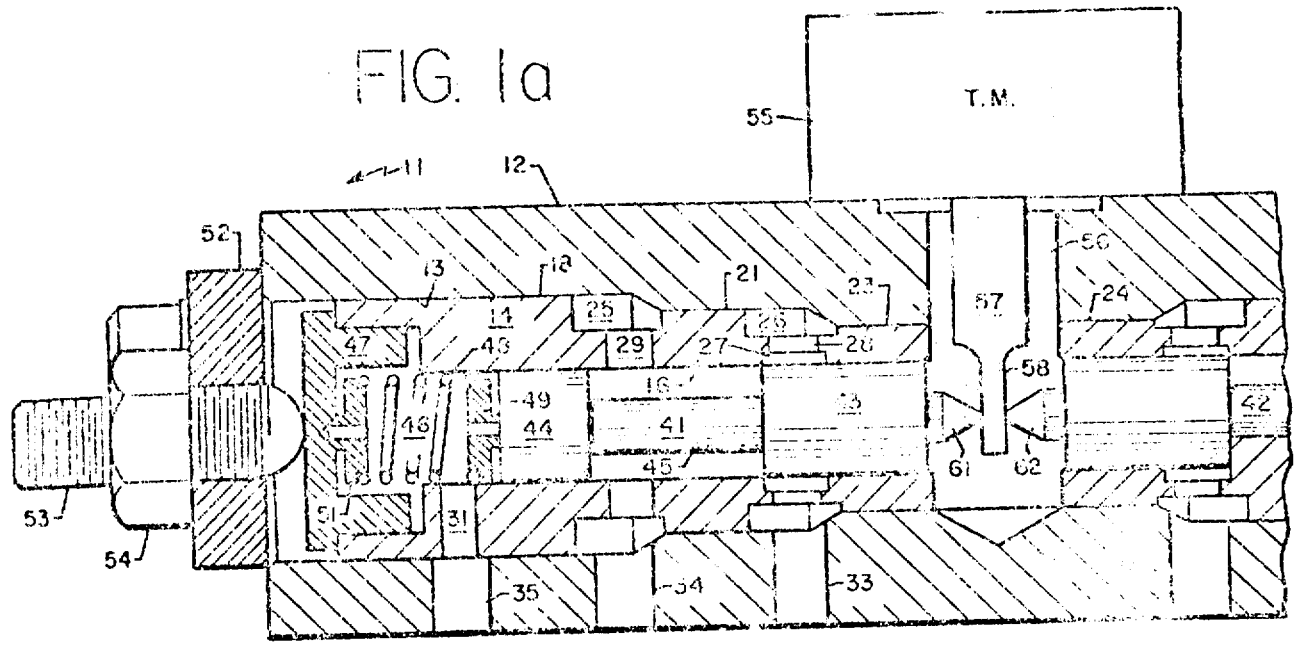

Referring first to FIGS. 1 and 1a, there is shown a valve housing indicated generally by the reference character 11. The term "housing" is intended to include various items such as the valve body, the sleeves, the manifolds, the end caps, and various other items which enclose, support and connect various portions of the valve. More particularly, the housing includes a valve body 12 formed to define a chamber 13 which is generally, although not precisely, cylindrical in shape, as will be more fully explained. The housing 11 also includes two identical generally cylindrical sleeves 14 and 15 disposed at opposite ends of the chamber 13 in axial alignment with each other. The interior surfaces of these sleeves define coaxial hollow cylinders 16 and 17, respectively. The valve body 12 is also formed so that the chamber 13 includes first and second portions 18 and 19 at opposite ends thereof each having a first diameter and also includes third and fourth portions 21 and 22 adjacent to the portions 18 and 19, respectively, and having a second diameter less than the first diameter. The chamber also includes fifth and sixth portions 23 and 24 adjacent to the portions 21 and 22, respectively, and having a diameter less than that of portions 21 and 22. The exterior of the sleeve 14 is formed to make a sliding fit with the portions 18, 21 and 23 while the sleeve 15 is formed to make a sliding fit with the portions 19, 22 and 24. The sleeve 14 is formed to define an exterior annular groove 25 communicating with the chamber 13 and positioned to embrace the junction between the portions 18 and 21. The sleeve 14 also includes a similar groove 26 also communicating with the chamber 13 and positioned to embrace the junction between the portions 21 and 23. The sleeve 14 is also formed to define an internal annular groove 27 positioned opposite the groove 26 and in communication with the hollow cylinder 16. A radial passageway 28, such as one or two drilled holes, provides communication between the exterior groove 26 and the interior groove 27. The sleeve 14 also includes another radial passageway 29 which may also be one or more drilled holes, and which provides communication between the hollow cylinder 16 and the exterior groove 25. The sleeve 14 is also formed to define a radial passageway 31, such as a single drilled hole, near the left end of the sleeve as shown. The sleeve 15 is identical to the sleeve 14 and is formed with corresponding grooves and passageways.

The valve body 12 is formed to define radial passageways 33, 34 and 35 extending completely therethrough and in registration with the groove 26, the groove 25 and the passageway 31, respectively. These grooves and passageways overlap each other sufficiently so that even though the sleeve be shifted axially a short distance communication is maintained. The valve body also includes radial passageways 36, 37 and 38 which register with the corresponding grooves and passageways in the sleeve 15.

Two identical pistons indicated generally by the reference characters 41 and 42 are disposed within the sleeves 14 and 15, respectively. The piston 41 includes an inboard land 43 and an outboard land 44 both of which make a hydraulic fit with the interior of the hollow cylinder 16. The lands 43 and 44 are connected by a reduced diameter portion 45. The piston 41 is shorter than the sleeve 14 so that there is an end space 46 to the left of the piston as viewed in the drawing. The end space is closed by a bushing 47 which abuts the end of the sleeve 14. A spring 48 acts between spring plates 49 and 51, the former of which abuts the left face of the land 44 and the latter of which abuts the bushing 47. The body 12 is longer than the sleeve 14 and the open end thereof is closed by an end cap 52 which is bolted or otherwise fastened to the body 12. An adjusting screw 53 is threaded into the end cap 52 and has a rounded end which abuts the bushing 47. A lock nut 54 is threaded on to the exterior of the adjusting screw 53.

A torque motor 56 is fastened to the valve body 12 approximately at the center thereof. The valve body 12 is formed with a recess 56 extending approximately perpendicular to the axis of the chamber 13 and intersecting it approximately in its center. The torque motor 55 includes an actuating arm 57 formed to define a finger 58 which projects into the recess 56 and extends between the pistons 41 and 42. The right end of the piston 41 is provided with a protrusion 61 having a rounded end and the left end of the piston 42 is provided with a similar protrusion 62. The finger 58 extends between these protrusions and is engaged by them on opposite sides as shown.

The right hand portion of the valve assembly is the same as the left, described above, and need not be further described in detail except to note that the adjusting screw is denoted by the reference character 63.

In operation, it is contemplated that the passageways 34 and 37 will be connected to a source of pilot fluid under pressure and that the passageways 33 and 36 will be connected to the utilization device, such as the control ports of a second stage valve. The passageways 35 and 38 may be connected to the fluid return unless the valve is to be used in a feedback arrangement in which case these ports may be used for such feedback.

The valve is shown in its neutral position which it occupies in the absence of an input signal. The spring 48 and its counterpart on the other side urge the pistons 41 and 42 toward each other so that their protrusions 61 and 62 engage the finger 58. The fluid under pressure in the passageway 34 is in communication with the chamber 13 in the region of the annular groove 25 and acts on that portion of the sleeve 14 which defines the left edge of the groove 25 and also acts on that portion which defines the right edge of the groove 25. However, the left edge has a larger area so the net effect is to urge the sleeve 14 to the left. The sleeve abuts the bushing 47 which in turn abuts the end of the adjusting screw 53 thereby holding the sleeve in the position shown. If the land 43 is not line-on-line with the groove 27, the lock nut 54 may be loosened and the screw 53 adjusted one way or the other until the desired relationship is obtained. If desired, a certain amount of dead space may be provided. The sleeve 15 may be similarly adjusted by means of the screw 63.

An input signal applied to the torque motor 55 will cause the finger 58 to be displaced one way or the other. Let it be assumed that it is displaced to the right. Then the piston 42 will be urged to the right and the spring 48 will likewise urge the piston 41 to the right thereby opening a passageway across the land 43 from the hollow cylinder 16 to the groove 27 to the passageway 28, to the groove 26 and to the passageway 33. This allows fluid to flow from the passageway 34 to the passageway 33. When the input signal is removed, the finger 58 will move the piston 41 back to the position shown in the drawing and the piston 42 will be urged back to its neutral position by its associated spring.

It is to be noted that with this construction, assembly is comparatively easy because the torque motor can be installed, the sleeves placed in opposite ends of the valve body 12 and the pistons and various other associated parts can be slipped in very easily. The spring urged engagement of the protrusions 61 and 62 with the finger 58 eliminates backlash and binding. Also, the null position, that is the position at which the flow to passageways 33 and 36 is blocked, can be adjusted very easily by means of the adjusting screws 53 and 63 which can be adjusted to provide as little or as much dead space as desired.

Although not mentioned previously, and although not essential for the invention, it is to be noted that fluid pressure in the passageways 33 and 36 will also urge the pistons 41 and 42 to the left and right respectively.

Referring now to FIGS. 2a and 2b, there is shown another embodiment of the invention. The valve housing 71 includes a valve body 72 formed to define a hollow cylinder 73 extending completely therethrough. The body is also formed to define a number of generally radial passageways 74, 75, 76, 77 and 78 and 79, each providing communication between the hollow cylinder 73 and the exterior of the valve body. The passageways 74, 76, 77 and 79 may be simple holes drilled in the valve body perpendicular to the cylinder and communicating therewith. The passageways 75 and 78 preferably each comprise a hole drilled from the edge of the valve body into the cylinder and extending into the valve body a short distance on the opposite side of the cylinder as shown so as to form a small recess. However, this is not essential.

Two identical pistons 81 and 82 are disposed in opposite ends of the hollow cylinder 73 in axial alignment with each other. The piston 81 includes lands 83, 84 and 85 each making a hydraulic fit with the interior of the hollow cylinder 73 and being connected to each other by reduced diameter portions 86 and 87. In the neutral, or reference position of the valve as shown in the drawing, the lands 83 and 84 are on opposite sides of the passageway 76 so that this passageway communicates with the cylinder 73 in the region of the reduced diameter portion 86 of the piston 81. The cut-off edge of the land 84, which is the right hand face as shown in the drawing, is approximately line on line with the cut-off edge of the passageway 75 which is the right hand edge of this passageway as viewed in the drawing. The passageway 74 communicates with the end space 88 to the left of the land 85. This end space is closed by a plug 89 threaded into the valve body 72. A spring 91 acts between the plug 89 and the left hand face of the land 85 so as to urge the piston 81 to the right as viewed in the drawing.

A torque motor indicated schematically at 92 is fastened to the valve body 72 at approximately the center thereof. The valve body is formed with a bore 93 extending approximately perpendicular to the hollow cylinder 73 and intersecting it in approximately its center. The torque motor 92 includes an actuating arm 94 which projects into the bore 93. The arm 94 is formed to define a finger 95 on the end thereof which extends between the adjacent ends of the pistons 81 and 82. The right hand end of the piston 81, which is the right face of the land 83, is formed with a small axial aperture 96 into which is placed an adjusting screw 97. The end of the screw within the aperture is formed with a hexagonal recess 98 while the other end of the screw projects beyond the end of the land 83 and is provided with a rounded tip 99. The screw 97 is provided with external threads and carries a hexagonal self locking nut 101 by which the length of the screw projecting beyond the land 83 may be adjusted. The piston 82 is identical to the piston 81 and also carries an adjusting screw 102. As shown in the drawing, the finger 95 of the torque motor actuating arm 94 extends between and is engaged by the tips of both of the adjusting screws 97 and 102. The right hand end of the valve is similar to the left hand end previously described and includes a similar end space, spring, and plug.

In operation, it is contemplated that the passageways 76 and 77 will be connected to a source of fluid under pressure and that the passageways 75 and 78 will be connected to a useful load device such as the control conduits of a second stage valve. The passageways 74 and 79 will be connected to the return unless the valve is to be used in a feedback arrangement in which case they may carry feedback pressures to the ends of the pistons 81 and 82. In the absence of an input signal to the torque motor 92, the parts will be substantially in the positions shown with the land 84 blocking communication between the passageways 76 and 75 and with the corresponding land on the piston 82 blocking communication between the passageways 77 and 78. An input signal to the torque motor 92 will displace one or the other of the pistons 81 or 82 thereby establishing communication either between passageways 76 and 75 or between passageways 77 and 78, according to the sense of the input signal. The engagement of the tips of the screws 97 and 102 with the finger 95 eliminates backlash yet allows a small amount of sliding motion between the finger 95 and these tips so as to avoid binding. Assembly of the valve is easy because with the plug 89 removed the parts may be simply inserted. Adjustment of the neutral position of the piston 81 is made by adjusting the position of the nut 101 on the screw 97 which therefore adjusts the position of the cut-off edge of the land 84 with respect to the cut-off edge of the passageway 75. The piston 82 may be adjusted in a similar manner. The same adjustment can provide a certain amount of dead space if that is desired for the particular application.

Although two preferred embodiments of the invention have been described in considerable detail for illustrative purposes, many modifications will occur to those skilled in the art. It is therefore desired that the protection afforded by Letters Patent be limited only by the true scope of the appended claims.

What is claimed is:

1. A valve system including a valve housing formed to define a hollow cylinder and a plurality of generally radial passageways each providing communication between the interior of said cylinder and the exterior of said housing, first and second pistons disposed in said cylinder and each including a plurality of lands located for cooperation with said passageways to define a reference position at which communication among said passageways is blocked, a torque motor responsive to an input signal and including an actuating arm formed to define a finger which extends between adjacent ends of said pistons for displacing said pistons from said reference position so as to establish communication between selected ones of said passageways, and first and second springs acting between said housing and said first and second pistons respectively for urging said pistons toward each other and toward engagement with said finger, characterized in that said valve housing includes a valve body formed to define a generally cylindrical chamber and also includes first and second generally cylindrical sleeves disposed in said chamber in axial alignment with each other and in sliding engagement with the surface of said chamber, and in which said passageways in said housing comprise registering and overlapping passageways in said sleeves and said valve body each communicating with the exterior of said body, with said chamber and with said hollow cylinder, said first and second pistons being disposed in said first and second sleeves respectively, said valve body being formed so that said chamber includes first and second portions at opposite ends thereof each having a first diameter and third and fourth portions adjacent to said first and second portions, respectively, and extending inwardly of said chambers, said third and fourth portions having a second diameter less than said first diameter, and in which said sleeves are so formed and located that said first sleeve makes a sliding fit with said first and third portions of said chamber and said second sleeve makes a sliding fit with said second and fourth portions of said chamber, and in which one of said passageways communicates with said chamber at the junction of said first and third portions and another of said passageways communicates with said chamber at the junction of said second and fourth portions whereby fluid under pressure in said last named passageways urges said sleeves outwardly away from each other, and in that said system includes first and second means for adjustably limiting the movement of each of said sleeves resulting from said urging.

2. A valve system in accordance with claim 1 in which said means for limiting includes first and second adjusting screws threaded into said valve housing.

3. A valve system including a valve housing formed to define a hollow cylinder and a plurality of generally radial passageways each providing communication between the interior of said cylinder and the exterior of said housing, first and second pistons disposed in said cylinder and each including a plurality of lands located for cooperation with said passageways to define a reference position at which communication among said passageways is blocked, a torque motor responsive to an input signal and including an actuating arm formed to define a finger which extends between adjacent ends of said pistons for displacing said pistons from said reference position so as to establish communication between selected ones of said passageways, and first and second springs acting between said housing and said first and second pistons respectively for urging said pistons toward each other and toward engagement with said finger, characterized in that said housing includes a valve body formed to define a generally cylindrical chamber and also includes first and second generally cylindrical sleeves disposed within said chamber in axial alignment with each other and in sliding engagement with the interior surface of said chamber and together defining said hollow cylinder in which said pistons are disposed and in which said passageways in said housing comprise registering passageways in said body and said sleeves each communicating with the exterior of said body, with said chamber, and with said hollow cylinder and in which said chamber and said sleeves are formed to define enlarged diameter portions at opposite ends and reduced diameter portions inwardly thereof with each junction between enlarged and reduced diameter portions communicating with one of said passageways, whereby the presence of fluid under pressure in such passageways urges said sleeves outwardly away from each other, and which includes means for adjustably limiting the movement of each of said sleeves resulting from said urging.

4. A valve system including a valve housing formed to define a hollow cylinder and a plurality of generally radial passageways each providing communication between the interior of said cylinder and the exterior of said housing, first and second pistons disposed in said cylinder and each including a plurality of lands located for cooperation with said passageways to define a reference position at which communication among said passageways is blocked, a torque motor responsive to an input signal and including an actuating arm formed to define a finger which extends between adjacent ends of said pistons for displacing said pistons from said reference position so as to establish communication between selected ones of said passageways, and first and second springs acting between said housing and said first and second pistons respectively for urging said pistons toward each other and toward engagement with said finger, characterized in that said system includes first and second adjusting screws positioned at adjacent ends of said first and second pistons respectively, and protruding therefrom and engaging opposite sides of said finger, whereby adjustment of said screws adjusts the relative positions of said lands and said passageways.

5. A valve system in accordance with claim 4 which includes first and second lock nuts threaded onto the exterior of said first and second adjusting screws respectively.

* * * * *

UNITED STATES PATENT OFFICE
CERTIFICATE OF CORRECTION

Patent No. 3,910,310     Dated October 9, 1975

Inventor(s) Paul F. Hayner

It is certified that error appears in the above-identified patent and that said Letters Patent are hereby corrected as shown below:

In the Abstract, line 21, "with" (second occurrence) should read ---which---.

On the cover sheet, cancel illustrative drawing and insert Fig. 1A as shown on the attached sheet.

Signed and Sealed this twenty-third Day of March 1976

[SEAL]

Attest:

RUTH C. MASON
*Attesting Officer*

C. MARSHALL DANN
*Commissioner of Patents and Trademarks*